United States Patent [19]

Katsube et al.

[11] Patent Number: 4,506,129

[45] Date of Patent: Mar. 19, 1985

[54] APPARATUS FOR PROCESSING A BROKEN WIRE ELECTRODE USED DURING ELECTRO-DISCHARGE MACHINING

[75] Inventors: Hideo Katsube; Gotaro Gamo; Mitsuo Kinoshita; Yoshiyuki Nomura, all of Hachioji, Japan

[73] Assignee: Fujitsu Fanuc Limited, Minamitsuru, Japan

[21] Appl. No.: 387,842

[22] PCT Filed: Oct. 14, 1981

[86] PCT No.: PCT/JP81/00280

§ 371 Date: Jun. 7, 1982

§ 102(e) Date: Jun. 7, 1982

[87] PCT Pub. No.: WO82/01339

PCT Pub. Date: Apr. 29, 1982

[30] Foreign Application Priority Data

Oct. 14, 1980 [JP] Japan .................. 55-143415

[51] Int. Cl.³ .................................... B23P 1/08
[52] U.S. Cl. .................... 219/69 W; 219/69 E
[58] Field of Search ............... 219/69 M, 69 W, 69 S, 219/69 R, 69 E

[56] References Cited

U.S. PATENT DOCUMENTS 3,987,270  10/1976  Ullman et al. .................. 219/69 W
4,338,505   7/1982  Katsube et al. ................. 219/69 W
4,350,864   9/1982  Janicke et al. ................. 219/69 W
4,379,959   4/1983  Inoue ........................... 219/69 W

FOREIGN PATENT DOCUMENTS

5115897  8/1979  Japan .
54-17597 8/1979  Japan .

Primary Examiner—M. H. Paschall
Attorney, Agent, or Firm—Staas & Halsey

[57] ABSTRACT

In an apparatus for processing a broken wire electrode in a wire-cut electric discharge machine for cutting a workpiece into a desired contour by electric discharge machining while the workpiece is transported relative to a wire electrode on the basis of machining command data, there is disclosed an apparatus for processing a broken wire electrode including a memory (CPX, CPY) for storing the position at which the wire electrode broke, an operator's panel with jog buttons (PJX, MJX, PJY, MJY) for generating a movement command following wire breakage to retract the workpiece from the wire breakage position (Xc, Yc), motors and drive circuitry (PD, SX, SY, MX, MY) for transporting the workpiece to a predetermined position on the basis of command, and a fitted point return button (Br) on the operator's panel for generating a signal to position the workpiece at the wire breakage position after the wire electrode is rethreaded in a wire transfer system.

3 Claims, 13 Drawing Figures

APPARATUS FOR PROCESSING A BROKEN WIRE ELECTRODE USED DURING ELECTRO-DISCHARGE MACHINING

BACKGROUND OF THE INVENTION

This invention relates to an apparatus for processing a broken wire electrode in a wire-cut electric discharge machine equipped with the function of returning a wire electrode, following the breakage thereof, to a fixed point such as a machining starting point or the position at which the wire broke. More particularly, the invention relates to an apparatus for processing a broken wire electrode in a wire-cut electric discharge machine equipped with a memory for storing the position of wire breakage, means for generating a movement command which retracts a workpiece from the breakage position after the wire breaks, means for positioning the workpiece at a predetermined rethreading position on the basis of the command, and means for positioning the workpiece at the breakage position after the wire electrode is rethreaded in the wire transfer system.

A wire-cut electric discharge machine establishes a voltage differential between the wire electrode and a workpiece to induce an electrical discharge in the intervening space. The machine moves the workpiece relative to the wire electrode on the basis of machining command data, whereby the workpiece is cut into the desired shape owing to the electrical discharge as the workpiece moves. In an electric discharge machine of this type, there are occasions where the wire electrode breaks within the workpiece when the applied voltage, workpiece feed speed and other machining conditions are improper during the electric discharge machining operation. To repair the wire electrode following breakage, the operator pulls the wire electrode upwardly through a lower guide, rethreads it through a groove cut in the workpiece, and attaches it to a take-up mechanism via an upper guide. The lower guide is a hindrance, however, and the narrow width of the cut groove makes it difficult to pass the wire electrode through the groove. Accordingly, it is ordinary practice to move the workpiece or wire electrode manually by a jog-feed to bring a starting bore of a large diameter, provided in the workpiece, into coincidence with the wire electrode position in a horizontal plane, and then thread the broken wire electrode through the starting bore and attach it to the take-up mechanism via the guide member. When the broken wire electrode is repaired in this fashion, considerable labor is required to bring the wire electrode position within the horizontal plane into coincidence with the starting bore by the manual feed operation. Consequently, there is a decline in machining efficiency since a considerable period of time is required following wire breakage to rethread the wire in the wire electrode transfer system and execute electric discharge machining from the position of wire breakage.

Accordingly, an object of the present invention is to provide an apparatus for processing a broken wire electrode in a wire-cut electric discharge machine in which, when the wire electrode breaks, the wire electrode can be rethreaded in the wire electrode transfer system and electric discharge machining can be resumed from the breakage position in a short period of time.

SUMMARY OF THE INVENTION

In accordance with the present invention, a workpiece is machined by electric discharge into a desired contour while the workpiece is moved relative to a wire electrode on the basis of machining command data. There are provided a memory for storing the position of wire electrode breakage, means for generating a command for retracting the workpiece away from the breakage position after the wire breaks, means for positioning the workpiece at a predetermined position on the basis of the command, and means for positioning the workpiece at the breakage position after the wire electode is rethreaded in the wire transfer system. Thus, in accordance with the present invention, the broken wire electrode is passed through the large-diameter starting bore or through the groove cut in the workpiece, at a position to which the workpiece is temporarily retracted from the breakage position, that is, at a position where the lower guide does no interfere with the rethreading operation, and is then attached to the take-up mechanism via the upper guide. This permits a reduction in the time required for repairing the wire, without the lower guide interfering with the operation.

BRIEF DESCRIPTION OF THE DRAWINGS

FIGS. 2 through 4, including 4(a)–4(b) are illustrative views for describing the method of rethreading a wire electrode, in which FIGS. 2 and 3 are simplified illustrative views of a wire electrode pull-up mechanism and FIG. 4 is an illustrative view for describing the procedure through which the wire electrode is threaded through a starting bore and then pulled up;

FIG. 8, including 8(a)–8(d) is an illustrative view for describing another method of processing a broken wire according to the present invention.

DESCRIPTION OF THE PREFERRED EMBODIMENTS

Reference will now be had to the accompanying drawings to describe the present invention in greater detail.

Figure 1:
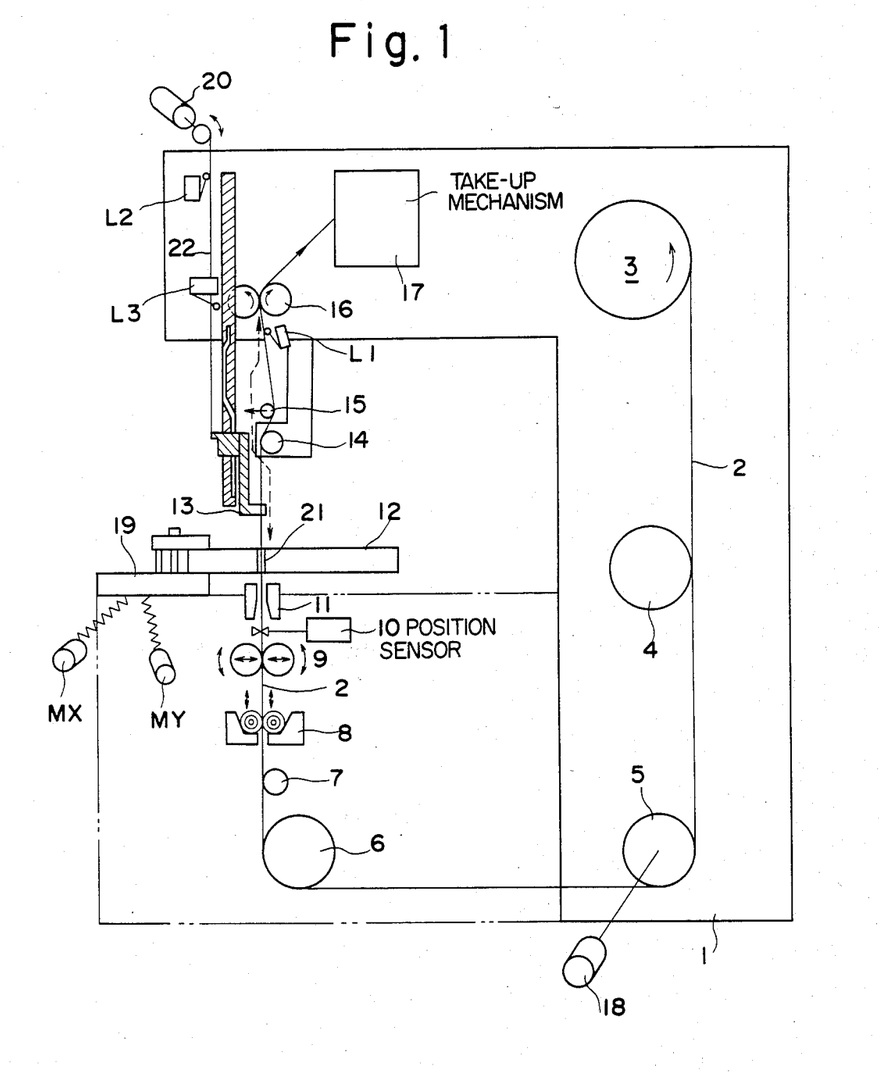
FIG. 1 is a simplified illustrative view of a wire-cut electric discharge machine capable of realizing the present invention.

FIG. 1 is a simplified structural view of a wire-cut electric discharge machine to which the present invention can be applied.

In the Figure, numeral 1 denotes a column, 2 a wire electrode, 3 a supply reel, 4 a tension brake, 5, 6 guide rollers, 7 a lower guide, 8 a clamping mechanism, 9 a wire electrode feed mechanism, 10 a wire electrode position sensor, 11 a nozzle, 12 a workpiece, 13 a wire electrode pull-up mechanism, 14 an upper guide, 15 a conduction pin, 16 a feed roller, 17 a wire electrode take-up mechanism, 18 a pulse coder for generating a pulse each time the guide roller 5 rotates by a predetermined amount, and 19 a table mechanism on which the workpiece 12 is placed. MX, MY represent workpice feed motors for driving the table mechanism 19 in the X and Y directions, respectively, to transport the workpiece 12 in the X and Y directions. Numeral 20 denotes a motor for driving the wire electrode pull-up mechanism 13. $L_1$, $L_2$, $L_3$ represent limit switches, $L_1$ designating a limit switch for sensing wire electrode breakage, and $L_2$, $L_3$ designating limit switches for detecting when lowering and elevation of the wire electrode pull-up mechanism have been completed, respectively.

The wire electrode 2 ordinarily is guided substantially vertically between the lower guide 7 and upper guide 14 and is fed in the longitudinal direction by the feed roller 16. A high voltage is applied to the wire electrode 2 via the conduction pin 15, whereby a high-voltage differential develops between the wire electrode 2 and workpiece 12 to produce an electric discharge. When the workpiece 12 is suitably transported in a horizontal plane by the motors MX, MY, therefore, the workpiece is cut along a desired contour by the electric discharge.

There are occasions where the wire electrode 2 breaks within the workpiece 12 when the applied voltage, workpice feed speed and other machining conditions are improper during the electric discharge machining operation. The breakage of wire electrode 2 is detected when limit switch $L_1$ is turned off owing to a loss of tension in the wire electrode portion on the take-up side.

When the wire breaks, the relative movement between the workpiece 12 and wire electrode is terminated immediately, as is the flow of current into the wire electrode 2. Also terminated are the transfer of the wire and the supply of a machining fluid. Thereafter, the portion of the wire electrode on the take-up side is fed upwardly from the breakage position by the feed roller 16 and is taken up by the wire electrode take-up mechanism 17. Meanwhile, the wire electrode portion below the breakage position, that is, on the supply side, is clamped by the clamping mechanism 8 at almost the same time as breakage occurs, after which the end of the wire electrode is pulled back to a predetermined position by the wire electrode feed mechanism 9. Clamping the wire electrode portion on the supply side in this fashion by means of the clamping mechanism 8 prevents this portion of the wire electrode from falling and becoming entangled in the other parts of the mechanism. This makes it possible to automate the rethreading of the wire electrode in the transfer system, including such steps as passing the wire electrode 2 through a large-diameter starting bore at the machining starting point, as will be described below, and introducing the wire electrode into the upper guide 14 and feed roller 16. In controlling the wire electrode pull-back operation on the supply side, driving the wire electrode feed mechanism 9 feeds the abovementioned portion of the wire electrode and causes it to back up toward the reel 3. When the wire position sensor 10 no longer senses electrical contact with the wire electrode 2, that is, when the end of the wire electrode portion passes the sensing point of the wire position sensor 10 so that electrical contact is lost, the driving action of the wire electrode feed mechanism 9 is halted to position the end of the wire electrode portion. The wire electrode feed mechanism 9, although not illustrated in detail, includes a pair of drive rollers and a motor for driving the rollers. During discharge machining the rollers are separated from each other at non-operating positions. The rollers are brought together to operating positions when the wire electrode portion of the supply side is pulled back, or when the wire electrode is fed into the starting bore at the machining starting point, as will be described below. In the operating positions the rollers grasp the wire electrode and are rotated in predetermined directions to pull the wire electrode back or feed it into the starting bore.

Following breakage, and upon completion of the operation for taking up the wire electrode portion on the take-up side, for clamping the wire electrode portion on the supply side and for positioning the end of the wire electrode, the motors MX, MY are driven by a numerical control device, to be described later, to transport the workpiece 12 relative to the wire electrode 2 so that the workpiece 12 is returned to the machining starting point, at which a large diameter starting bore is formed, or to another predetermined point, after which the wire electrode rethreading operation is executed.

Figure 2:
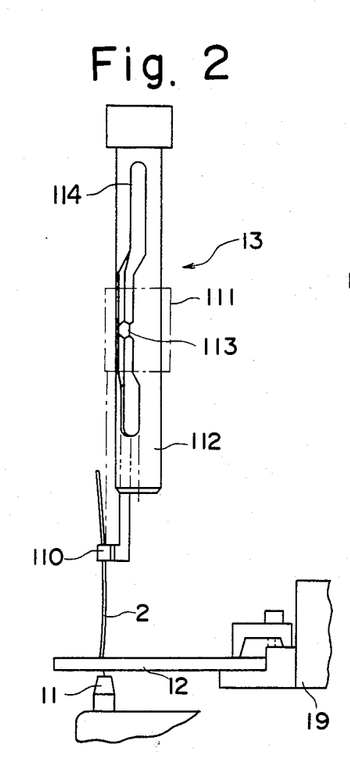
Figure 3:
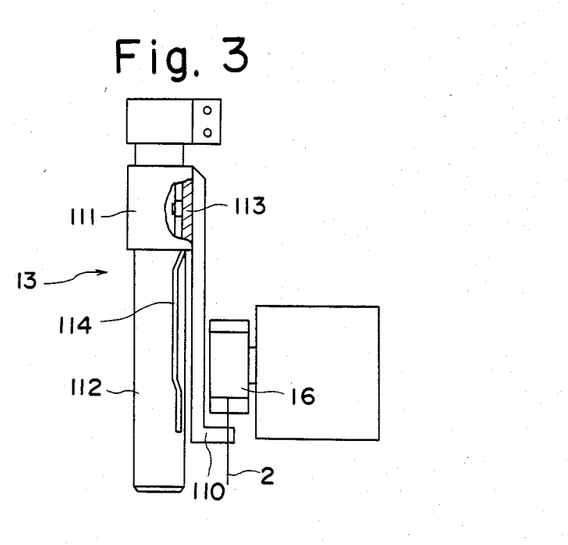
Figures 4A, 4B, 4C:
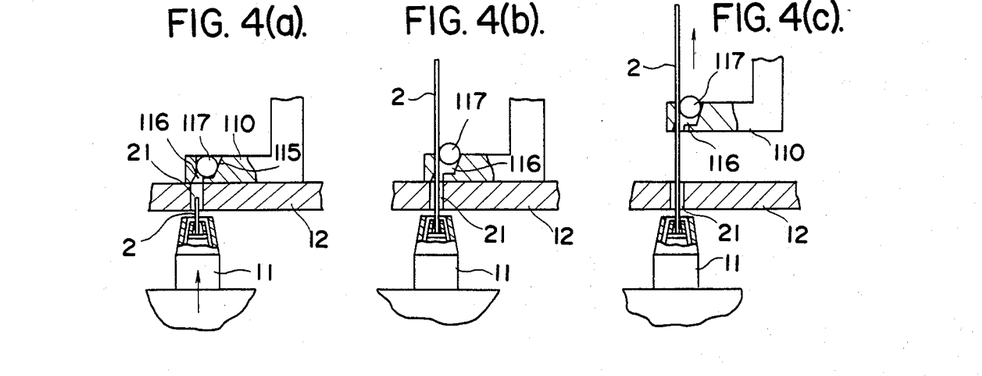

FIGS. 2 through 4 are illustrative views for describing the method of rethreading the wire electrode, in which FIGS. 2 and 3 are simplified illustrative views of a wire electrode pull-up mechanism, and FIGS. 4(a) through (c) are illustrative views for describing the procedure through which the wire electrode is threaded through a starting bore and then pulled up.

The wire electrode pull-up mechanism 13 includes a wire electrode gripping portion 110, a sliding portion 111 connected to the gripping portion, and a shaft portion 112. The sliding portion 111 is capable of sliding up and down along the shaft portion 112 and is provided with a pin 113 which is engaged with a coulisse 114 provided in the shaft portion 12. As it slides up and down the sliding portion undergoes rotational motion decided by the shape of the coulisse 114. The purpose of this rotational motion is to assure that the pull-up mechanism 13 will not interfere with the upper guide 14 in the process of setting the wire electrode 2 on the feed roller 16 (FIG. 1). The gripping portion 110 includes a hole 116 defining a tapered wall portion 115 {FIG. 4(a)}, and receives a roller 117 having a knurled surface. In the operation of the wire electrode pull-up mechanism 13, the motor 20 (FIG. 1) is rotated to lower the gripping portion 110 via a cord 22. The cord 22 slackens when the gripping portion 110 comes to rest upon the upper surface of the workpiece, and the limit switch $L_2$ (FIG. 1), for detecting the end of the lowering operation, opens upon sensing the slack in the cord, thereby stopping the motor 20. The result is illustrated in FIG. 4(a). When the wire electrode feed mechanism 9 (FIG. 1) is driven to feed in the wire electrode 2 by a predetermined amount, the wire electrode 2 passes through the large diameter starting bore 21 provided in the workpiece, as illustrated in FIG. 4(b), pushes up the roller 117 and passes through the hole 116, the wire electrode protruding from above the hole 116. Next, when the motor 20 is run in the reverse direction to elevate the gripping portion 110, the wire electrode 2 is clamped between the roller 117 and the wall portion of the hole 116, as shown in FIG. 4(c), so that the wire electrode 2 is pulled upwardly as the gripping portion 110 is elevated. When the elevation of the gripping portion 110 ends, the limit switch $L_3$ (FIG. 1) for detecting the end of the elevating operation closes, thereby stopping the rotation of the motor 20. At this time the upper end of the wire electrode 2 has been pulled up to a position high enough to permit it to be engaged by the feed rollers 16, as shown in FIG. 3, the latter then being rotated to feed the wire electrode, thereby ending the automatic rethreading operation and cancelling the signal indicative of wire breakage (i.e., limit switch $L_1$ is closed). The amount by which the wire electrode 2 is fed is changed depending upon the thickness of the workpiece 12. Control is so effected that the wire electrode 2 protrudes from the upper surface of the workpiece 12 by a fixed amount for any workpiece whatsoever. For example, if an amount of feed in accordance with workpiece thickness is entered by means of the manual input unit MDI of a numerical control device, driving of the wire electrode feed mechanism 9 will cease when the pulse coder 18 (FIG. 1) generates the number of pulses corresponding to the amount of feed, thereby leaving a fixed length of the wire electrode 2 projecting from the upper surface of the workpiece 12.

When the rethreading of the wire electrode 2 through the foregoing operation ends, the numerical control device, not shown, executes positioning processing to restore the wire electrode to the position at which it broke, and to resume the machining operation. When the wire electrode is to be restored to the breakage position, feeding the workpiece 12 at the machining speed requires considerable time. For this reason it is desirable to feed the workpiece under well-known dry-run control, in which feeding takes place at a separately set feed speed. With such an expedient the relative position between the workpice 12 and wire electrode 2 reaches the breakage position by traveling, at a high speed, along the path which was cut up to the instant of breakage. Following the completion of positioning at the breakage position, the numerical control device confirms whether the machining preparations for the electric discharge machine are complete. Specifically, when the numerical control device confirms that the wire electrode 2 is tensioned is the transfer path, that the machining fluid is being supplied, and that the wire electrode is receiving current, etc., so that all the conditions required for the start of machining have been met, the numerical control device issues a command for the start of machining, whereby electric discharge machining is resumed while the workpiece 12 is moved relative to the wire electrode 2 from the breakage position on the basis of the machining command data.

Figure 5:
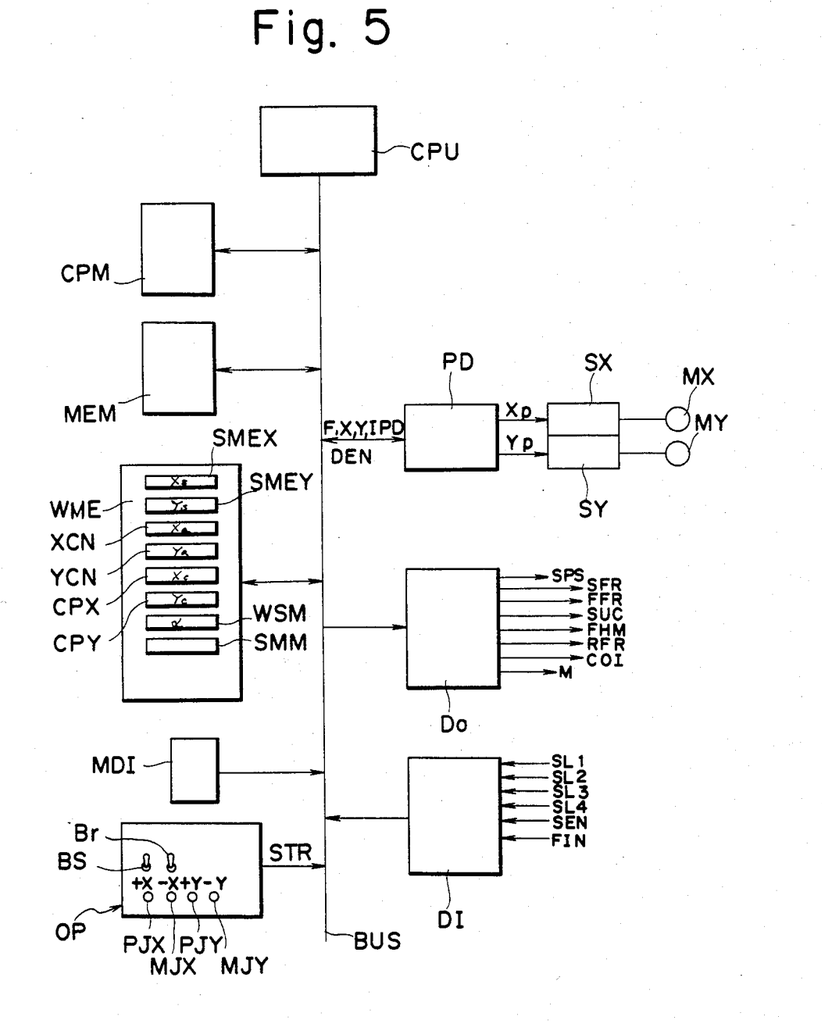
FIG. 5 is a block diagram showing the electrical system of a numerical control device in a wire-cut electrical discharge machine for realizing the present invention.
Figure 6:
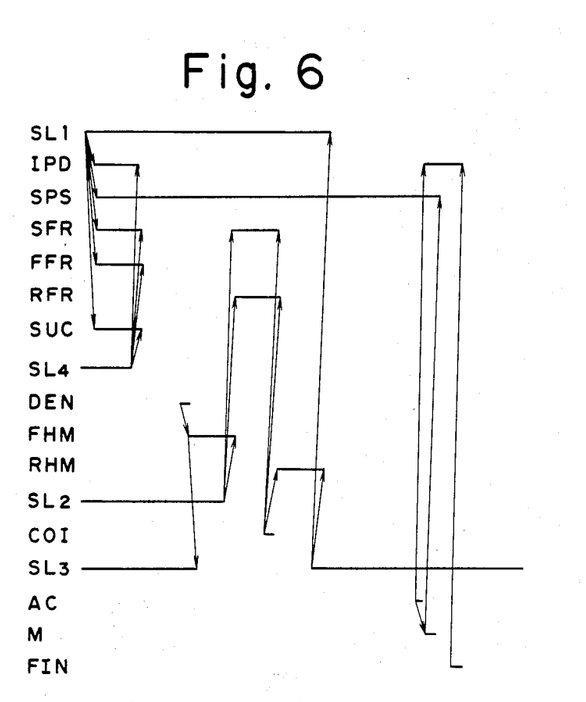
FIG. 6 is an operation timing chart.

FIG. 5 is a block diagram showing the electrical system of a numerical control device in a wire-cut electric discharge machine for realizing the present invention, and FIG. 6 is an operation timing chart.

The numerical control device is constructed as a well-known computerized numerical control device, and includes a central processing unit CPU, a memory MEM for storing machining data comprising a number of items of machining data, a working memory WME for storing the machining starting position, breakage position and the like, as well as the results of processing operations executed by the central processing unit CPU, a control program memory CPM for storing the control program, a manual input unit MDI for entering the amount of wire electrode feed when rethreading the wire electrode, as well as a command for the return to the machining starting point, an operator's panel OP having such switches as a cycle start button $B_s$ and a fixed point return button $B_r$ for generating a signal which commands a return to the machining starting point, which is a fixed point, a pulse distributor PD for performing a pulse distribution operation on the basis of positional command data to produce distributed pulses, a digital output unit DO for delivering a command signal from the numerical control device to the machine side, a digital input unit DI for feeding signals from the machine side to the central processing unit CPU, and servo circuits SX, SY for driving the X-and Y-axis drive motors MX, MY, respectively. An exchange of data with the central processing unit CPU takes place via a bus line BUS.

Figure 7:
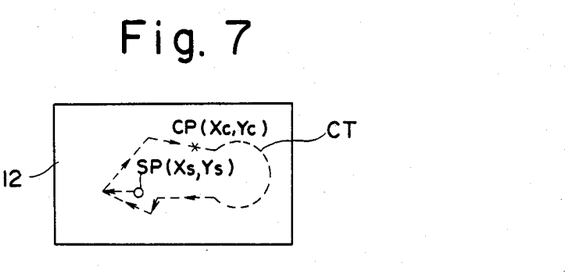
FIG. 7 is an illustrative view of a cut contour.

Next will be described the broken wire processing method in a case where the wire electrode breaks during machining, the description relating to FIG. 7 in which the workpiece is to be cut by electric discharge machining into the contour CT (dashed line). In FIG. 7, numeral 12 denotes the workpiece. The dashed line CT is the desired contour to be cut by the wire electrode. SP represents the machining starting point on the contour CT, and CP represents the wire breakage position.

A G-function command (G92) is issued in order to set the coordinate values (XS, YS), specifying the machining starting point SP of the contour CT, at the beginning of the machining program stored in the memory MEM. The coordinate values (XS, YS) of the machining starting point are specified by X . . . , Y . . . which follow G92.

When the cycle start button BS on the operator's panel is depressed, the central processing unit CPU, under the control of the control program, reads out the machining command data G92 X☐☐. . . ☐, Y∆∆. . . ∆, at the beginning of the machining program, from the memory MEM, and stores the machining starting position (XS, YS), in the form $X_s$=☐☐. . . ☐, $Y_s$=∆∆. . . ∆, in machining starting point storage areas SMEX, SMEY of the working memory WME. The machining data is read out successively thereafter. When the machining data is data relating to the relative motion between the workpiece and wire electrode, namely to feed speed F and amounts of movement X, Y, these items of data F, X, Y are applied to the pulse distributor PD. The pulse distributor PD performs a pulse distribution operation on the basis of such data to produce distributed pulses XP, YP that are sent to the servo circuits SX, SY. The contents of present position storage areas XCN, YCN in working memory WME are counted up or down in accordance with the direction of movement each time a distributed pulse XP, YP is generated. The servo circuits, upon receiving the distributed pulses XP, YP, drive the motors MX, MY on the basis of well-known servo control, whereby the workpiece 12 is transported relative to the wire electrode 2 at the commanded feed speed. Assume now that the wire electrode 2 breaks for some reason at the point CP (FIG. 7) on the workpiece 12 during the course of machining. Limit switch $L_1$ will sense the event owing to the loss of tension in the wire electrode 2, whereby a signal $SL_1$ (Sig. 6), indicative of wire breakage, is generated to interrupt the central processing unit CPU via the digital input unit DI. When this occurs, the control program shifts to an interruption routine to execute interruption handling for wire breakage. It should be noted that the wire electrode portion on the supply side is clamped mechanically by the clamping mechanism 8 (FIG. 1) at almost the same time as breakage occurs. When the interrupt is generated the broken wire thenceforth begins to be repaired under the control program. More specifically, the central processing unit CPU responds to the control program by sending a distribution inhibit signal IPD to the pulse distributor PD to halt the pulse distribution operation. It also causes the breakage position (XC, YC), stored at the present position storage areas XCN, YCN to be transferred to and stored in the breakage position storage areas CPX, CPY of the working memory WME. Further, the CPU issues a signal SPS through the digital output unit DO, which signal stops the supply of electric current to the wire electrode, the operation of the wire transfer system, and the supply of the machining fluid. It should be noted that the halting of these operations can be controlled on the machine side in response to the opening of the limit switch $L_1$.

Next, the central processing unit CPU generates signals SFR, FFR through the digital output unit DO. The signal SFR causes a pair of drive rollers of the wire electrode feed mechanism 9 to assume the operating positions and grasp the portion of the wire electrode on the supply side. The signal FFR causes the roller drive motor of the wire electrode feed mechanism 9 to rotate in the forward direction so that the wire electrode 2 is pulled back toward the supply reel on the supply side. In pulling back the wire electrode 2, an unclamp signal SUC is applied to the clamping mechanism 8 to place it in the unclamped state. Thus the clamping mechanism 8 is unloaded when the wire electrode is pulled back.

When the end of the wire electrode 2 passes by the sensing point of the position sensor 10 as the wire electrode is being pulled back, a signal $SL_4$ indicative of the fact goes to logical "0". This signal is read by the central processing unit CPU through the digital input unit DI, whereby the signals SFR, FFR, SUC are turned off through the output unit DO to return the drive rollers of the wire electrode feed mechanism 9 to the non-operating positions, thereby positioning the end of the wire electrode 2 at the position just beyond the sensing point of the position sensor 10.

After completion of the above-described processing for pulling back the wire electrode, the fixed point return button Br on the operator's panel OP is depressed, or a command G30 indicating a return to the machining starting point is issued from the manual data input unit MDI, whereupon the central processing unit CPU turns the distribution inhibit signal IPD off, reads the coordinates (XS, YS) of the machining starting point and the breakage position coordinates (XC, YC) out of the respective machining starting point storage areas SMEX, SMEY and breakage position storage areas CPX, CPY of the working memory WME, executes the operations:

X←XS−XC

Y←YX−YC to find the incremental values between the breakage position and the machining starting point in the X and Y directions, and applies the results of the operations, namely X and Y, to the pulse distributor PD. The pulse distributor PD performs a pulse distribution operation on the basis of X, Y, whereby the workpiece 12 is returned linearly to the machining starting point SP at a rapid rate in response to the distributed pulses XP, YP. When the pulse distribution is completed, namely when the workpiece 12 arrives at the machining starting point, the pulse distributor PD applies a distribution end signal DEN to the central processing unit CPU. The central processing unit CPU starts the rethreading of the wire electrode 2 in response to the distribution end signal DEN. First, the central processing unit CPU delivers a signal FHM through the output unit DO to start the motor 20 (FIG. 1), thereby initiating the lowering of the gripping portion 110 (FIG. 2) of the wire electrode pull-up mechanism 13. When the gripping portion 110 comes to rest on the workpiece 12, cord 22 (FIG. 1) slackens, limit switch $L_2$ is turned off and signal $SL_2$ goes to logical "0". Signal $SL_2$ is read by central processing unit CPU through the digital input unit DI, whereby signal FHM is turned off to terminate the descent of the gripping portion. Further, the central processing unit CPU generates the signals SFR, RFR by reading the signal $SL_2$="0", thereby holding the drive rollers of the wire electrode feed mechanism 9 at the operating positions and rotating the roller drive motor in the reverse direction. This passes the portion of the wire electrode on the supply side through the starting bore 21 of workpiece 12, as shown in FIG. 4(a) and 4(b), and feeds the wire through the hole 116 in the gripping portion 110. It should be noted that the amount of feed d of the wire electrode 2, decided by the thickness of the workpiece 12, is entered from the manual input unit MDI and stored in a commanded feed storage area WSM of the working memory WME. Each time the guide roller 5 is rotated by a predetermined amount as the wire electrode 2 is fed, the pulse coder 18, which is connected to the guide roller 5, generates a pulse. When this pulsed signal SEN is read in through the digital input unit DI, the content of a feed storage area SMM of the working memory WME is incremented by +1, the content of the storage area SMM then being compared with the commanded feed d stored in the commanded feed storage area WSM. When the contents of the storage areas WSM, SMM coincide, a coincidence signal COI is generated, turning the signals SFR, RFR off to end the feeding of the wire electrode 2. In addition, a signal RHM is generated in response to the coincidence signal COI, whereby motor 20 starts to rotate in the reverse direction to commence the elevation of the gripping portion 110. When the gripping portion reaches its upper limit, the limit switch $L_3$ is turned on to generate a signal $SL_3$ indicating that the elevating operation is complete. The central processing unit CPU responds to the signal $SL_3$ by turning off signal RHM to halt the rotation of motor 20 and terminate the ascent of the gripping portion 110. At this time the end of the wire electrode 2 is engaging the feed roller 16, as shown in FIG. 3, thereby completing the rethreading of the wire electrode 2. The signal $SL_1$ indicative of wire electrode breakage is cancelled in response to completion of the threading operation. When the cancellation of the wire breakage signal $SL_1$ is sensed by the central processing unit CPU, the CPU retrieves the address of memory MEM at which the head data of the machining program is stored with G92 serving as the keyboard, and reads out the machining data successively from this address to position the workpiece at the wire breakage position along the previously cut path. If the relative speed between the workpiece 12 and wire electrode 2 from the machining starting point SP to the wire breakage point CP were to be set to the machining speed (commanded speed) which prevails at the time of the electric discharge machining operation, a considerable amount of time would be required to reach the breakage point CP. For this reason a dry run is designated by the operator's panel OP to enable the setting of any desired feed speed.

The central processing unit CPU constantly compares the present position, stored in the present position storage areas XCN, YCN, with the breakage position (XC, YC) stored in the breakage position storage areas CPX, CPY, and transports the workpiece 12 on the basis of the machining data read out of the memory MEM until the two positions are in coincidence. At the instant coincidence is achieved (coincidence signal AC="1"), the CPU causes the distribution inhibit signal IPD to be sent to the pulse distributor PD to halt the pulse distribution operation. As a result, the workpiece 12 stops moving relative to the wire electrode 2. In response to AC="1", the central processing unit CPU sends a miscellaneous function command to the machine side through the digital output unit DO to supply the machining fluid, feed the wire via the wire electrode transfer system and apply voltage, etc. When the CPU receives a signal FIN from the machine side, indicating the completion of machining preparations, the distribution inhibit signal IPD is cancelled. From then on the workpiece 12 is transported at the commanded speed to resume the electric discharge machining operation.

The foregoing embodiment is for a case where the workpiece, owing to breakage of the wire electrode, is positioned at the machining starting point at which a large diameter starting bore is formed. However, it is not strictly necessary that the workpiece be positioned at the machining starting point.

FIG. 8 is an illustrative view for a case where the workpiece is retracted manually to any position following completion of the wire electrode pull-back operation, permitting the wire electrode to be rethreaded at said position.

Figure 8A:
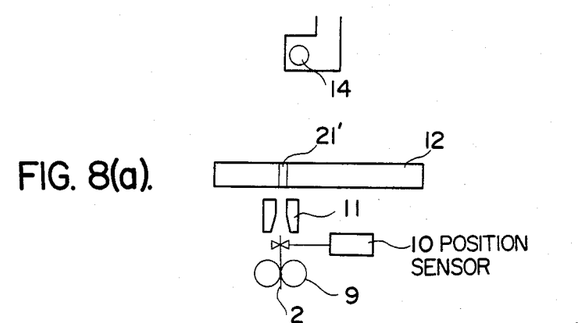
Figure 8B:
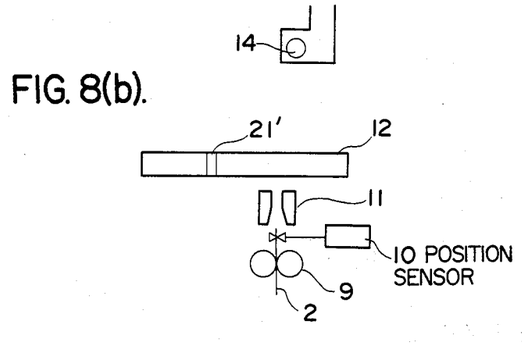
Figure 8C:
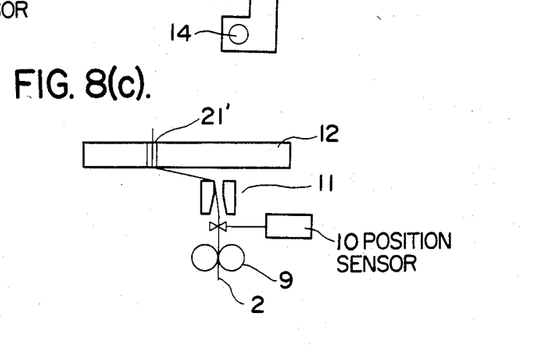
Figure 8D:
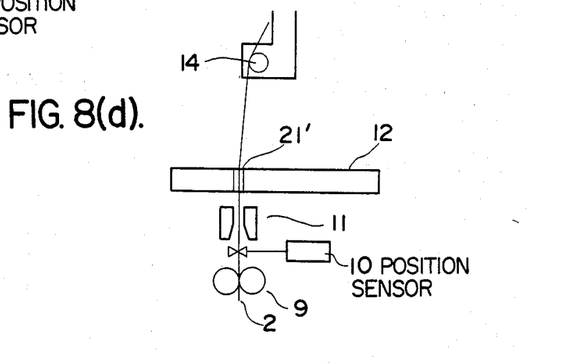

Following completion of the wire electrode pullback operation executed due to breakage of the wire (FIG. 8(a)), predetermined jog buttons PJX, MJX, PJY, MJY on the operator's panel OP are manipulated to generate manual feed pulses, whereby the workpiece is retracted to any position where the lower guide or nozzle will not interfere with the rethreaded operation (FIG. 8(b)). At said position the wire electrode 2 is manually passed through the nozzle 11, pulled upwardly and reinserted through the groove 21' cut in the workpiece (FIG. 8(c)). Thereafter the wire electrode 2 is passed through the upper guide 14 and attached to the take-up mechanism. When the fixed point return button Br on the operator's panel OP is depressed under these conditions, the central processing unit CPU reads the breakage position (Xc, Yc) and the present position (Xa, Ya) out of the breakage position storage areas CPX, CPY and present position storage areas XCN, YCN, executes the operations:

$$\Delta X \leftarrow Xc - Ya$$

$$\Delta Y \leftarrow Yc - Ya$$

to find the incremental values $\Delta X$, $\Delta Y$ in the X and Y directions up to the breakage position, which is a fixed point, and applies the results of the operations, namely $\Delta X$, $\Delta Y$, to the pulse distributor PD. The pulse distributor PD performs a pulse distribution operation on the basis of $\Delta X$, $\Delta Y$, whereby the workpiece is returned linearly to the breakage position at a rapid rate. More specifically, the central processing unit CPU constantly compares the present position, stored in the present position storage areas XCN, YCN, with the breakage position (XC, YC) stored in the breakage position storage areas CPX, CPY, and transports the workpiece 12 until the two positions coincide. At the instant coincidence is achieved (coincidence signal AC="1"), the CPU causes the distribution inhibit signal IPD to be sent to the pulse distributor PD to halt the pulse distribution operation. As a result, the workpiece 12 stops moving relative to the wire electrode 2. In response to AC="1", the central processing unit CPU sends a miscellaneous function command M to the machine side through the digital output unit DO to supply the machining fluid, feed the wire via the wire electrode transfer system and apply voltage, etc. When the CPU receives a signal FIN from the machine side, indicating the completion of machining preparation, the distribution inhibit signal is cancelled. From then on the workpiece 12 is transported along the cutting path at the commanded speed to resume the electric discharge machining operation.

In the foregoing embodiments the workpiece 12 is described as being moved. However, it is permissible to move the wire electrode 2 with respect to the workpiece. Further, the distributed pulses XP, YP are counted reversibly each time they are generated to give an indication of present position. It is possible, however, to indicate the present position by counting feedback pulses generated whenever the motors MX, MY rotate by a predetermined amount, or whenever the workpiece moves by a predetermined amount.

In addition, when G92 Xoo . . . . . o, Yoo . . . . . o are commanded at the beginning of the machining program, the head address of the machining program is retrieved with G92 serving as the keyword, and the workpiece is moved to the wire breakage position on the basis of the machining data read out from the head address following the rethreading of the wire electrode. The present invention is not limited to this arrangement, however, since the head address may be retrieved with the miscellaneous command "M60" or the sequence number of the initial item of machining data serving as the keyword.

Also, while it has been described that the machining program is stored in memory beforehand and that the machining operation is processed by reading the machining data of the memory sequentially, the machining program may be punched in a tape with the machining data then being read from the tape by means of a tape reader. In such case, however, the tape reader must be capable of reading backwards, and G92 or the sequence number must be searched by a backward reading operation, in order to move the workpiece following the threading of the wire electrode.

Furthermore, the machine coordinates specifying the machining starting point have been set by G92. However, it is permissible to set the coordinates manually using the manual input unit MDI.

What is claimed is:

1. In an apparatus for processing a broken wire electrode in a wire-cut electric discharge machine for cutting a workpiece from a starting position into a desired contour by electric discharge machining while the workpiece is transported relative to a wire electrode on the basis of machining command data, the apparatus having a wire nozzle, being rethreaded manually and comprising:

a memory for storing the position at which the wire electrode broke;

manually operated means for generating feed pulses following wire breakage to transport the workpiece from the wire breakage position to an exposed rethreading position noncoincident with the wire nozzle permitting convenient manual rethreading of the wire in a wire transfer system;

means for generating feed pulses to position the workpiece at the wire breakage position, after the wire electrode has been manually rethreaded in the wire transfer system, by moving the workpiece along a straight line from the exposed rethreading position back to the wire breakage position; and positioning means for positioning the workpiece relative to the wire electrode in dependence upon the feed pulses.

2. An apparatus for processing a broken wire electrode according to claim 1, wherein the means for positioning the workpiece at the wire breakage position includes a manually operable push-button for generating a command for return to the wire breakage position.

3. An apparatus for processing a broken wire electrode according to claim 1, wherein the means for positioning the workpiece at the wire breakage position includes a manual input unit for generating a command for return to the wire breakage position.

* * * * *

UNITED STATES PATENT AND TRADEMARK OFFICE
CERTIFICATE OF CORRECTION

PATENT NO. : 4,506,129

DATED : March 19, 1985

INVENTOR(S) : HIDEO KATSUBE ET AL.

It is certified that error appears in the above-identified patent and that said Letters Patent is hereby corrected as shown below:

On the title page;

[56] References Cited

"Ullman" should be --Ullmann--.

[57] Abstract line 16, "fitted" should be --fixed--.

Col. 2, line 20, "no" should be --not-- line 30, "4(b)" should be --4(c)--;

line 43, "8(d)" should be --8(d),--.

Col. 7, line 45, "YX" should be --YS--.

Col. 8, line 13, "d" should be --$\underline{d}$--;

line 24, "d" should be --$\underline{d}$--;

line 49, "keyboard" should be --keyword--.

Signed and Sealed this

Twenty-second Day of October 1985

[SEAL]

Attest:

DONALD J. QUIGG

*Attesting Officer*

*Commissioner of Patents and Trademarks—Designate*